United States Patent [19]
Shiue et al.

[11] Patent Number: 5,846,269
[45] Date of Patent: Dec. 8, 1998

[54] WEAR RESISTANT BOND FOR AN ABRASIVE TOOL

[75] Inventors: Ren-Kae Shiue, Taipei, Taiwan; Richard Andrews, Westborough, Mass.; Thomas W. Eagar, Belmont, Mass.; Bradley Miller, Westboro, Mass.; Sergej-Tomislav Buljan, Acton, Mass.

[73] Assignee: Norton Company, Worcester, Mass.

[21] Appl. No.: 693,763

[22] Filed: Aug. 7, 1996

[51] Int. Cl.⁶ ....................................................... B24D 3/02
[52] U.S. Cl. ................................................ 51/295; 51/309
[58] Field of Search ............................. 51/293, 295, 307, 51/309; 420/470, 492; 148/412, 433

[56] References Cited

U.S. PATENT DOCUMENTS

| | | | |
|---|---|---|---|
| 3,178,273 | 4/1965 | Libal | 51/293 |
| 3,894,673 | 7/1975 | Lowder et al. | 228/122 |
| 4,018,576 | 4/1977 | Lowder | 51/309 |
| 4,586,967 | 5/1986 | Shapiro et al. | 148/412 |
| 4,968,326 | 11/1990 | Wiand | 51/293 |
| 5,102,621 | 4/1992 | Sara | 420/470 |
| 5,308,367 | 5/1994 | Julien | 51/293 |
| 5,492,771 | 2/1996 | Lowder et al. | 428/565 |

FOREIGN PATENT DOCUMENTS

| | | | |
|---|---|---|---|
| 1086509 | 7/1977 | Canada | B24D 3/10 |
| 480878 | 10/1991 | European Pat. Off. | B24D 3/06 |
| 53-0102220 | 9/1978 | Japan | 148/433 |
| 58-358113359A | 7/1986 | Japan | 148/133 |
| 63-0266051 | 11/1988 | Japan | 148/433 |

OTHER PUBLICATIONS

R.B. Aronson, "CBN Grinding—a tempting technology", Manufacturing Engineering, Feb. 1994, p. 35.

J.A. Borkowski and A.M. Szymanski, "Uses of Abrasives and Abrasive Tools", Ellis Horwood Ltd., 1992.

M. M. Schwartz, "Brazing", ASM International, 1987.

G. Humpston and D.M. Jacobson, "Principles of Soldering and Brazing," ASM International, 1993.

M.M. Schwartz, "Ceramic Joining," ASM International, 1989.

"ASM Handbook," vol. 6, ASM International, 1993.

R.W.K. Honeycombe, "Steels–Microstructure and Properties". No Date.

J.F. Elliott and M. Gleiser, "Thermochemistry for Steelmaking," vol. 1. No Date.

H.K. Lee and J.Y. Lee, "Decomposition and Interfacial Reaction in Brazing of SiC by Copper–Based Active Alloys," Journal of Materials Science Letters, 11, 1992, pp. 550–553.

J. Wilks and E. Wilks, "Properties and Applications of Diamond," Butterworth–Heinemann Ltd., 1991.

*Primary Examiner*—Deborah Jones
*Attorney, Agent, or Firm*—Mary E. Porter

[57] ABSTRACT

A bond material for a metal single layer abrasive tool, and especially for a tool with diamond abrasive, provides an excellent combination of mechanical properties including structural strength and impact resistance. The bond material is sufficiently compatible with both metal and diamond to effectively wet the abrasive grains and the core of the tool during brazing. The bond material can braze at a temperature range low enough that the core will not distort and diamond grains will not graphitize during brazing. The novel bond material composition contains a copper/tin bronze alloy; elemental titanium; zirconium; hard granular wear resistant particles; and elemental carbon. The wear resistant particles are preferably titanium carbide. Importantly, the bond produced from the material has superior wear resistance while remaining very adhesive to diamond.

12 Claims, 3 Drawing Sheets

WEAR RESISTANT BOND FOR AN ABRASIVE TOOL

FIELD OF THE INVENTION

This invention relates to a bond material for a bonded abrasive grinding tool.

BACKGROUND AND SUMMARY OF THE INVENTION

There are many industrial applications for abrasive tools. Such tools typically include an abrasive portion of grains of a hard, abrasive substance embedded in a bond material. The abrasive portion is normally affixed to a rigid core support structure. The core can be adapted to be manually or power driven in moving contact with a work piece to grind, cut, polish or otherwise abrade the work piece to a desired shape.

Industrial grinding tools frequently include grains of very hard, superabrasive substances, such as diamond and cubic boron nitride. Such superabrasives are relatively expensive. To maintain reasonable tool costs, it is advantageous to reduce the amount of superabrasive on a grinding tool.

A segmented abrasive tool incorporates a large amount of grain which is typically dispersed uniformly throughout a thick layer of abrasive and bond. Generally, segmented abrasive tools provide long life because fresh grains are exposed when the outer cutting surface wears away during grinding. In comparison, so called "metal single layer" (MSL) abrasive tools use a very small amount of the abrasive, which is deposited in a layer of substantially one grain thickness on a metal core material, such as steel. The grains normally are held to the core by thin coating of brazed metal alloy bond.

Longevity is a potential problem for MSL tools because the tool ceases to function after the one layer of abrasive grains wears away. Grain separation from the core due to failure of the bond is a factor which can contribute to short working life. Hence, the quality of the bond can be very important for determining the useful life of an abrasive tool.

A good bond material for a MSL tool should have many features. It should be inexpensive and compatible with tool manufacturing processes. Some bond materials known for use in segmented abrasive tools are unsuitable for MSL tools. For example, nickel-based alloy bond materials need to be brazed at above 1000° C. Exposure to such high temperatures can distort the core and cause diamond to graphitize. Silver-based alloys braze in the satisfactory range below 1000° C. but are very expensive.

A good bond also should be adhesive to both abrasive grains and substrate, and yet be capable of chemical or electrochemical removal without damaging the substrate, such that the substrate may be reused.

In addition the bond should have excellent mechanical properties. Abrasive grains can separate from the core if the bond is weak. In that case the force of the work piece pushing against the grains can fracture the bond. If the bond is too brittle, it can shatter, which also releases the embedded grains and reduces tool life. Hence, it is important that the bond material have high cohesive bond strength and impact resistance. U.S. Pat. No. 4,968,326 discloses a method of making a metal single layer diamond abrading tool with good bond strength which can be varied to desired degree. The method employs a brazing material containing a carbide forming element, preferably molybdenum or iron. The claimed method also has the stated advantage that the carbide and braze layers tend to climb up the side of the diamond for increased strength of the brazing tool.

Wear resistance is yet another vital property of a high performance bond for MSL tools. During operation, the bond is in abrasive contact with the work piece and with cutting debris. Such contact tends to wear the bond material away until too little remains to secure the abrasive grains in place. Thus the bond can fail too quickly if it insufficiently resists abrasion.

Incorporating particles of a hard substance, such as carbides of tungsten, silicon and titanium in the bond has been attempted to improve wear resistance. This technique suffers from some drawbacks. For example, the particles can cluster thereby reducing the effectiveness of the hard substance. Also the particles consume a portion of the bond material which leaves less bond material to coat and hold the abrasive grains. Therefore, a low cost, low brazing temperature, strong, impact resistant, and strippable bond material for a metal single layer superabrasive tool which is very wear resistant is highly desirable.

Accordingly, there is presently provided a bond material for brazing a single layer of abrasive grains to an abrasive tool which has excellent adhesive and cohesive strength as well as superior wear resistance. The novel bond material comprises:

(a) 100 parts by weight of a bronze alloy consisting essentially of about 10–30 wt % tin and a complementary amount of copper;
(b) about 10–20 parts by weight titanium;
(c) about 5–15 parts by weight zirconium;
(d) about 0.1–0.5 parts by weight elemental carbon; and
(e) about 5–20 parts by weight titanium carbide.

There is also provided according to the present invention a bond produced by heat treating the above-described bond material. There is further provided an abrasive tool wherein the abrasive is bonded to a rigid metal core by the aforementioned bond.

This invention still further provides for a process for making a durable metal single layer abrasive tool, the process comprising the steps of
(1) mixing
  (a) 100 parts by weight of a bronze alloy consisting essentially of about 10–30 wt % tin and a complementary amount of copper;
  (b) about 10–20 parts by weight titanium;
  (c) about 5–15 parts by weight zirconium;
  (d) about 0.1–0.5 parts by weight elemental carbon; and
  (e) about 5–20 parts by weight titanium carbide; effectively to form a uniformly concentrated bond material;
(2) applying the bond material to a cutting surface of a metal core of an abrasive tool;
(3) applying a single layer of uniformly dispersed abrasive grains onto the cutting surface; and
(4) heating the bond material to a temperature and for a time effective to braze the abrasive grains to the metal core

DETAILED DESCRIPTION

Figure 1:
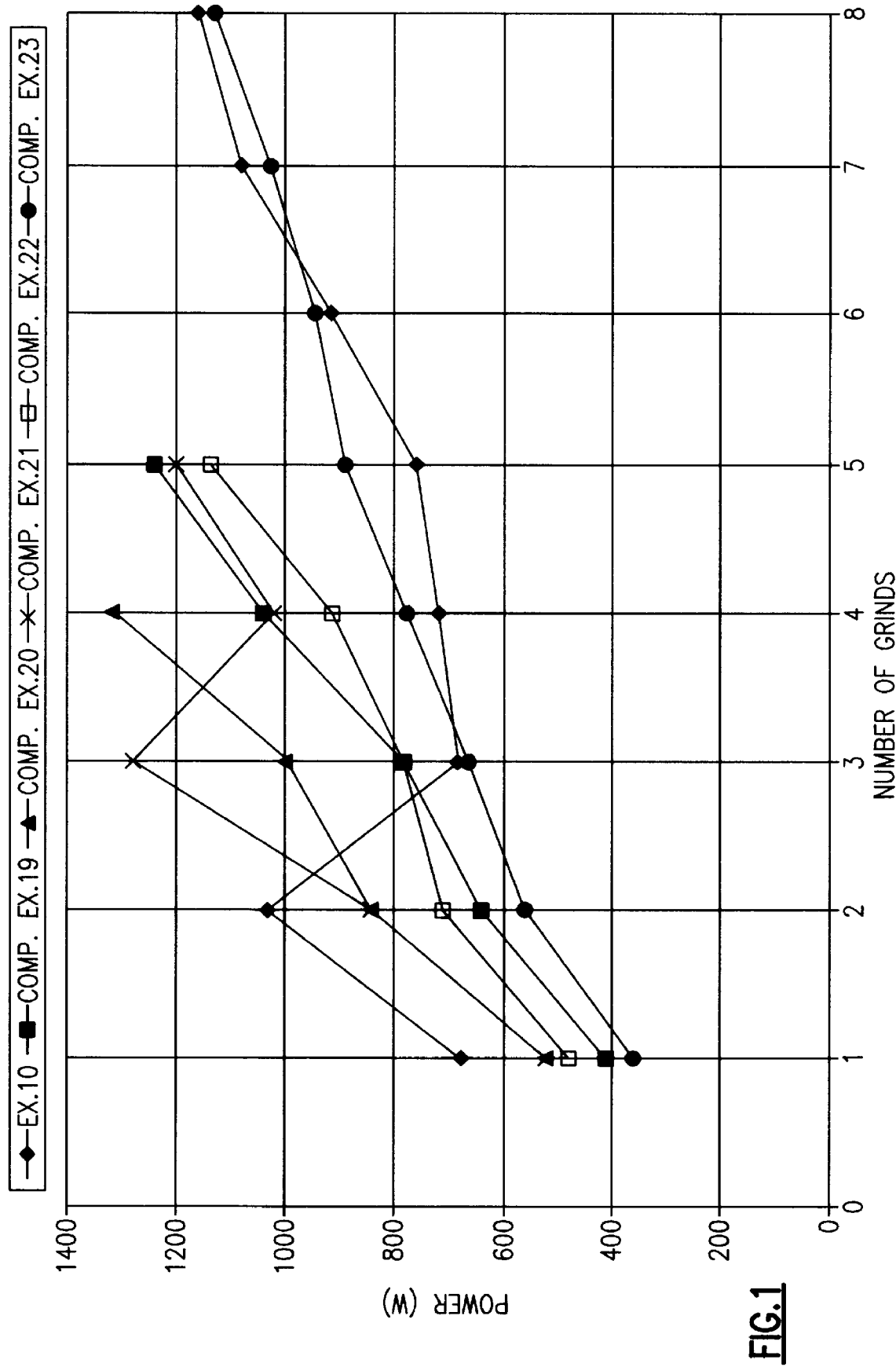
FIG. 1 is a plot of power consumption, P, vs. number of grinds, N, for metal single layer wheels using various bond and abrasive compositions.

The present invention involves a multicomponent bond material which can be used for adhering abrasive grains to the core of an abrasive tool. The components include a bronze alloy, titanium, zirconium, titanium carbide and elemental carbon. A liquid binder can be incorporated to form a dispensable, tacky paste. The tool is made by applying the bond material to a cutting surface of the core; depositing abrasive grains onto the cutting surface; and brazing the bond material to secure the abrasive grains in place on the core. Occasionally herein, the term "bond material" is used to designate the composition of the mixture of bond components. The term "bond" means the composition of the fused bond material after brazing.

The bronze alloy is preferably about 23–25 wt % tin and a complementary amount of copper to total 100 wt %. The bond material includes titanium in a form which can react during brazing with a superabrasive, particularly diamond. This reactivity improves the ability of the molten brazing composition to wet the surface of the abrasive grains. The resulting enhanced compatibility between bond and superabrasive is believed to promote adhesive bond strength. The titanium can be added to the mixture either in elemental or compound form. Elemental titanium reacts with water at low temperature to form titanium dioxide and thus becomes unavailable to react with diamond during brazing. Therefore, adding elemental titanium is less preferred when water, which sometimes can be a constituent of the liquid binder, is present. If titanium is added in compound form, the compound should be capable of dissociation during the brazing step to permit the titanium to react with the superabrasive. Preferably titanium is added to the bond material as titanium hydride, $TiH_2$, which is stable up to about 600° C. Above about 600° C., titanium hydride dissociates to titanium and hydrogen.

The novel bond material further includes hard particles for increased wear resistance. Better wear resistance is obtained when the particles are highly impact resistant (i.e., tough) and blocky shaped. The wear resistant particles preferably are granules smaller than about U.S. Sieve No.325 mesh (44 $\mu$m). The granules also should have sufficient bulk to impart wear resistance. Preferably average particle size of the wear resistant particles should be at least about 10 $\mu$m.

The wear resistant particles are preferably titanium carbide. Other substances such as tungsten carbide and silicon carbide are disfavored for use in the present invention. In the presence of titanium during brazing such other substances tend to reduce and form intermetallics which do not provide sufficient wear resistance. The wear resistant particles can also be small particle size (i.e., about 10–44 $\mu$m) superabrasive grains such as diamond, cubic boron nitride and mixtures of them.

The novel bond material also includes zirconium and elemental carbon. The zirconium is added primarily to increase the viscosity of the bond material in the molten state during brazing. Higher viscosity promotes even distribution of the titanium carbide particles throughout the bond. Preferably, the zirconium is added in elemental form. Zirconium in compound form, such as zirconium hydride, may be suitable if the compound dissociates to elemental zirconium in the bond at or below bond brazing temperatures. The carbon reacts with excess free titanium present in the bond material during brazing to form additional titanium carbide particles. Carbon can also react with zirconium to form hard zirconium carbide.

On the basis of 100 parts by weight ("pbw") bronze alloy, the bond material preferably contains about 10–15 pbw titanium; about 5–10 pbw zirconium; and about 10 pbw titanium carbide. Preferably, the elemental carbon is present at about 0.1–0.5 pbw, and more preferably about 0.2–0.4 pbw. A particularly preferred bond material contains about 100 pbw bronze alloy of 23 tin/77 copper; about 12.5 pbw titanium; about 7.5 pbw zirconium; about 10 pbw titanium carbide and about 0.2–0.4 pbw elemental carbon.

Generally, the components of the bond material are supplied in powder form. Particle size of the powder is not critical, however powder smaller than about 325 mesh (44 $\mu$m particle size) is preferred. The bond material is prepared by gently mixing the ingredients until the components are dispersed to a uniform concentration. The wear resistant particles can be mixed directly with the powder components. However, to avoid excessive size reduction during mixing, the wear resistant particles preferably are added to a homogeneous premixture of the other powder components. Then the complete powder and particle mixture is further agitated until the wear resistant particles are uniformly dispersed.

The dry powder bond material can be mixed with a low viscosity, liquid binder. The binder is added to the powder components in effective proportion to form a viscous, tacky paste. In paste form, the bond material can be accurately dispensed and is adhesive to the cutting surface of the core and the abrasive grains. Preferably, the bond material paste should have the consistency of tooth paste. The binder should be sufficiently volatile to substantially completely evaporate and/or pyrolyze during brazing without leaving a residue that might interfere with the function of the bond. Preferably the binder will vaporize below about 400° C. However, the binder volatility should be low enough that the paste remains fluid and tacky at room temperature for a reasonable time ("drying time") to apply the bond material and abrasive to the core and to prepare the tools for brazing. Preferably the drying time should be about 1–2 hours. Liquid binders suitable to meet the requirements of the novel bond material are commercially available. Representative paste-forming binders suitable for use in the present invention include Braz gel from Vitta Company; and Lucanex™ binder from Lucas Company. The latter can be obtained as a paste already mixed by the vendor with bond material components. The binder can be blended with the powders by many methods well known in the art such as ball milling. The order of mixing powders and liquid binder is not critical. However, as explained above, care should be given not to reduce the size of the wear resistant particles too much by excessive mixing.

The paste is coated onto the core by any of the techniques well known in the art, such as brushing, spraying, doctoring or dipping the surface of the tool in the paste. For example, the paste can be coated onto the core with the aid of a turning machine. A layer of abrasive grains then is deposited on the coating of bond material. The abrasive grains can be placed individually or sprinkled in a manner to provide even distribution over the cutting surface. The abrasive grains are deposited in a single layer, i.e., substantially, one grain thick. Particle size of the abrasive grains generally should be larger than the size of the wear resistant particles, i.e., larger than 325 mesh, and preferably, larger than about 140 mesh. The abrasive grains should be a superabrasive such as diamond and cubic boron nitride. Diamond is preferred.

Next the abrasive is brazed to the core. While the bond material is in place on the cutting surface of the core, the assembly is heated to an elevated temperature and held for a sufficient time for the bond material to fuse, causing the abrasive grains to adhere to the core. The brazing temperature should be less than about 1000° C. to avoid distorting the core or graphitizing the diamond. Preferably, the brazing temperature will be in the range of about 800°–950° C. After brazing, the tool is allowed to cool to ambient temperature. The brazed tool can then be cleaned, broken-in as needed, and packaged for commercial distribution.

It has been found that the unique combination of the components according to the present invention provide a very serviceable bond that exhibits high strength and wear resistance. Furthermore, compared to most conventional copper-based braze alloys, the coefficient of thermal expansion ("CTE") of the novel bond more closely matches that of the superabrasive. The CTE of the novel bond is approximately $6.8 \times 10^{-6}$ °$C^{-1}$ as compared to about $9.8 \times 10^{-6}$ °$C^{-1}$ of a conventional 100 parts by weight (23 wt % Sn/77 wt % Cu) bronze—10 parts by weight Ti bond. The CTE of diamond is about $2 \times 10^{-6}$ °$C^{-1}$. Because the CTE of the novel bond more closely matches that of superabrasive, residual tensile stress in the bond at the bond/superabrasive interface upon cooling after brazing should be reduced, thereby providing improved bond fatigue strength.

As stated, the preferred utility for the bond material of the present invention is in metal single layer abrasive tools. Accordingly, the amount of bond material employed should be effective to provide a thickness of bond less than the average diameter of the abrasive grains. However the bond can also function in multilayer or segmented abrasive tools. That is, tools in which the abrasive grains are dispersed within a matrix of bond that is greater than one grain thickness. To make such a tool, the abrasive grains can be mixed in a predetermined proportion with the bond material and the combined bond material/abrasive grain mixture can be applied to the cutting surface by various methods. For example, a binder can be incorporated into the mixture to form a paste which is deposited on the cutting surface. Alternatively, the bond material/abrasive grain mixture can be compacted adjacent to the core and fired at high temperature or compacted to form a segment and fired. Later the segment can be attached to the core.

This invention is now illustrated by examples of certain representative embodiments thereof, wherein all parts, proportions and percentages are by weight unless otherwise indicated. All units of weight and measure not originally obtained in SI units have been converted to SI units.

EXAMPLES

Examples 1–4 and Comparative Examples 1–4

Comparative Example 1 bond material of 75Cu-25Sn-10Ti-10Zr-10TiC was prepared as follows: 100 g of 75 Cu/25 Sn bronze powder from Connecticut Engineering Company; 10 g $TiH_2$ powder; 10 g Zr powder; log of TiC powder from CERAC Company were mixed to provide a uniform mixture. All the powders were nominal 325 mesh particle size, i.e., passed through 325 mesh screen. The uniform mixture was mixed with 26 g Braz™ gel from Vitta Corporation to form a dispensable paste. The paste was stored in a syringe until ready for use.

Similarly, samples of bond materials were also prepared as identified in Table I. The samples were made by adding in multiples of 0.1 g increments, 0.1 g–0.7 g of carbon black powder from Fisher Scientific Company of particle size smaller than 1 µm to the composition of Comp. Ex. 1. Each sample composition and a single 30/40 mesh natural diamond grain was brazed onto a steel plate substrate at 900° C. The grain was probed transversely to the bond surface with a steel stylus and the force necessary to push the grain off the substrate was measured. Each sample composition also was molded to form a bond in the shape of a 25.4 mm diameter, 15 mm high sample disk. Vickers hardness was measured on the disk. The push-off force and hardness measurements are shown in Table I. The data show that push-off force is satisfactory with elemental carbon additions up to 0.5 parts. However, at least about 0.1 parts elemental carbon is needed to maintain hardness above about 350 for superior wear resistance.

|  | Carbon pbw | Push-off force, N (lb) | Vickers Hardness |
|---|---|---|---|
| Comp. Ex. 1 | 0.0 | 187.6 (42.17) | 337.4 |
| Comp. Ex. 2 | 0.1 | 192.4 (43.25) | 350.0 |
| Ex. 1 | 0.2 | 184.0 (41.38) | 363.6 |
| Ex. 2 | 0.3 | 222.2 (49.95) | 367.0 |
| Ex. 3 | 0.4 | 211.8 (47.61) | 364.8 |
| Ex. 4 | 0.5 | 209.0 (47.00) | 413.9 |
| Comp. Ex. 3 | 0.6 | 149.4 (33.60) | 367.1 |
| Comp. Ex. 4 | 0.7 | 142.8 (32.10) | 382.3 |

Example 5 and Comparative Examples 5–13

The wear and erosion resistance of bonds of 100 pbw 75 Cu/25 Sn bronze alloy, 10 pbw titanium and a variety of additional components were measured. The bonds were each prepared as described in the preceding examples. For the wear test, the bond was formed into a 0.40 cm² cross section rod. The rod was ground by No. 180 silicon carbide paper with a constant load of 10 N. The volume of bond lost after each one minute increment of grinding was observed as shown in Table II. Erosion resistance was measured by blasting each sample of bond-coated surface from a distance of 0.635 cm with a steady stream of silicon carbide particles smaller than 325 mesh in nitrogen at 550 KPa gauge (80 psig) impinging at an angle of 30° for 60 seconds. The volume of bond lost is shown in Table II.

The wear test results indicate that after 480 seconds, the bond according to the present invention (Ex. 5) lost only about 27% and 25% of the volume of the next best performing bonds (Comp. Ex. 8 and Comp Ex. 12, respectively). The novel bond demonstrated moderate but satisfactory overall performance in the erosion test. Erosion test performance of Ex. 5 was significantly improved over Comp. Ex. 8 and was better than that of Comp. Ex. 12.

TABLE II

|  | Ex. 5 | Comp. Ex. 5 | Comp. Ex. 6 | Comp. Ex. 7 | Comp. Ex. 8 | Comp. Ex. 9 | Comp Ex. 10. | Comp. Ex. 11 | Comp. Ex. 12 | Comp. Ex. 13 |
|---|---|---|---|---|---|---|---|---|---|---|
| 75 Cu/25 Sn, pbw | 100 | 100 | 100 | 100 | 100 | 100 | 100 | 100 | 100 | 100 |
| Titanium, pbw | 10 | 10 | 10 | 10 | 10 | 10 | 10 | 10 | 10 | 10 |
| Zirconium, pbw | 10 |  |  |  |  |  |  |  |  |  |
| Carbon, pbw | 0.4 |  |  |  |  |  |  |  |  |  |
| Titanium carbide, pbw | 10 |  | 5 | 10 | 15 |  |  |  |  |  |

TABLE II-continued

|  | Ex. 5 | Comp. Ex. 5 | Comp. Ex. 6 | Comp. Ex. 7 | Comp. Ex. 8 | Comp. Ex. 9 | Comp Ex. 10. | Comp. Ex. 11 | Comp. Ex. 12 | Comp. Ex. 13 |
|---|---|---|---|---|---|---|---|---|---|---|
| Tungsten, pbw |  |  |  |  |  | 10 | 20 | 30 |  |  |
| Tungsten carbide, pbw |  |  |  |  |  |  |  |  | 10 |  |
| Molybdenum |  |  |  |  |  |  |  |  |  | 10 |
| Wear resistance, volume loss (mm3) |  |  |  |  |  |  |  |  |  |  |
| 60 seconds | 0.94 | 15.63 | 17.19 | 16.18 | 7.98 | 9.61 | 9.39 | 8.7 | 4.03 | 14.75 |
| 120 seconds | 2.29 | 28.79 | 30.25 | 30.65 | 11.18 | 17.74 | 20.1 | 17.16 | 8.14 | 26.41 |
| 180 seconds | 3.32 | 43.46 | 48.1 | 39.89 | 20.14 | 26.51 | 29.69 | 25.22 | 12.33 | 34.92 |
| 240 seconds | 4.05 | 56.46 | 57.74 | 51.78 | 20.98 | 34.6 | 40.26 | 34.07 | 15.91 | 45.93 |
| 300 seconds | 4.93 | 67.51 | 67.52 | 54.3 | 24.1 | 45.2 | 49.27 | 41.88 | 19.57 | 59.26 |
| 360 seconds | 5.79 | 76.13 | 77.62 | 56.93 | 25.41 | 53.16 | 57.44 | 50.00 | 23.23 | 68.21 |
| 420 seconds | 6.81 | 86.75 | 84.55 | 60.19 | 26.66 | 62.33 | 66.9 | 59.34 | 27.88 | 79.82 |
| 480 seconds | 7.72 | 99.26 | 95.39 | 60.9 | 28.41 | 70.28 | 76.05 | 69.61 | 30.92 | 89.75 |
| Erosion resistance, volume loss (mm3) | 0.472 | 0.492 | 0.493 | 0.541 | 0.606 | 0.446 | 0.415 | 0.356 | 0.515 | 0.441 |

Examples 6–9 and Comparative Examples 14–18

The effect on wear resistance of titanium, zirconium, titanium carbide and carbon concentration in the bond was evaluated in the following experiments. Selected bond materials were prepared in the manner of the preceding experiments. The sample bond materials were brazed at 920° C. and the bonds were erosion and wear tested as before. Compositions and results are shown in Table III. Data for Ex. 5 is also reproduced in Table III.

Table III shows that the wear resistance of the novel bonds was consistently superior to the comparative example bonds. Comp. Ex. 17 exhibited good erosion and wear resistance performance. However, small amounts of elemental carbon added to this composition, as in Ex. 6 and Ex. 5, further improved wear resistance without sacrifice in erosion resistance. Comparison of Comp. Ex. 16 and Ex. 5 shows that addition of 10 pbw titanium carbide particles only slightly reduces erosion performance from 0.483 to 0.472 mm³ but remarkably improves wear resistance from 132.58 mm³ to 5.79 mm³ after 360 seconds. Similarly, Comp. Ex. 17 shows that 10 pbw titanium carbide without elemental carbon component improves wear resistance a great deal but not as much as any of the operative examples 5–9. Ex. 8 compared to Ex. 5 demonstrates that a slight change in the proportion of titanium to zirconium while keeping the total of these components constant improves wear resistance and slightly compromises erosion performance.

TABLE III

|  | Comp. Ex. 14 | Comp. Ex. 15 | Comp. Ex. 16 | Comp. Ex. 17 | Comp. Ex. 18 | Ex. 5 | Ex. 6 | Ex. 7 | Ex. 8 | Ex. 9 |
|---|---|---|---|---|---|---|---|---|---|---|
| 75 Cu/25 Sn, pbw | 100 | 100 | 100 | 100 | 100 | 100 | 100 | 100 | 100 | 100 |
| Titanium, pbw | 10 | 10 | 10 | 10 | 10 | 10 | 10 | 10 | 12.5 | 12.5 |
| Zirconium, pbw |  | 10 | 10 | 10 | 10 | 10 | 10 | 10 | 7.5 | 7.5 |
| Carbon, pbw |  |  | 0.4 |  |  | 0.4 | 0.4 | 0.25 | 0.2 | 0.4 | 0.2 |
| Titanium carbide, pbw |  |  |  | 10 |  | 10 | 10 | 12.5 | 10 | 10 |
| Tungsten, pbw |  |  |  |  | 20 |  |  |  |  |  |
| Wear resistance, volume loss (mm³) |  |  |  |  |  |  |  |  |  |  |
| 60 seconds | 15.63 | 21.18 | 24.69 | 2.1 | 19.65 | 0.94 | 2.93 | 1.93 | 1.0 | 1.2 |
| 120 seconds | 28.79 | 45.68 | 46.75 | 3.1 | 39.35 | 2.29 | 4.45 | 2.68 | 1.6 | 2.32 |
| 180 seconds | 43.46 | 61.83 | 66.58 | 5.58 | 54.26 | 3.32 | 8.94 | 3.32 | 2.25 | 3.11 |
| 240 seconds | 56.46 | 79.18 | 88.81 | 7.51 | 66.25 | 4.05 | 9.73 | 4.34 | 2.82 | 4.29 |
| 300 seconds | 67.51 | 91.19 | 111.44 | 12.06 | 79.72 | 4.93 | 12.32 | 5.32 | 3.46 | 5.22 |
| 360 seconds | 76.13 | 95.41 | 132.58 | 13.15 | 85.36 | 5.79 | 12.85 | 7.47 | 3.98 | 6.04 |
| 420 seconds | 86.75 | 106.57 |  | 14.82 | 96.22 | 6.81 | 13.18 | 8.22 | 4.51 | 6.86 |
| 480 seconds | 99.26 | 117.24 |  | 15.56 | 105.69 | 7.72 | 13.44 | 9.13 | 5.07 | 7.47 |
| Erosion resistance, volume loss (mm³) | 0.492 | 0.568 | 0.483 | 0.58 | 0.44 | 0.472 | 0.623 | 0.649 | 0.739 | 0.874 |

Example 10 and Comparative Examples 19–23

Grinding wheels with the abrasives and bonds shown in Table IV were tested as follows: Bond materials for Ex. 10 and Comp. Ex. 22 were each combined as in the previously described examples. Other bond materials were used as furnished by the supplier. Wheel construction was metal single layer unless otherwise indicated in the table. The abrasive and bonds were applied to 12.7 cm diameter, 2.54 mm wide, metal single layer abrasive wheels which were used to grind a 20.32×10.16×2.54 cm, high density, 99.5% alumina block. The wheels were rotated to achieve a surface speed of 1524 m/min and were driven at 152.4 cm/min linear speed. Depth of cut was 0.432 mm. For purposes of this test, wheel failure was considered to have occurred when either normal force exceeded 1139 N/cm (650 lb$_f$/in.) or the wheel ceased to grind.

TABLE IV

| | Bond | Abrasive |
|---|---|---|
| Ex. 10 | 100 pbw 75 Cu/25 Sn 12.5 pbw titanium hydride 7.5 pbw zirconium 10 pbw titanium carbide 0.2 pbw carbon | 40/50 mesh IMG ™ diamond abrasive (Tomei Company) |
| Comp. Ex. 19 | commercially available, nickel-plated wheel from Norton Company | 40/50 mesh type IMG diamond abrasive |
| Comp. Ex. 20 | commercial nickel/chromium-based braze alloy (brazing temp. > 1000° C.) | diamond grain abrasive, type/quality unknown |
| Comp. Ex. 21 | Copper/Tin-based braze alloy with >30 wt% Sn and <10 pbw Ti | 40/50 mesh type IMG diamond abrasive |
| Comp. Ex. 22 | 100 pbw 77 Cu/23 Sn 10 pbw titanium hydride (Connecticut Engineering Co.) | 40/50 mesh type IMG diamond abrasive |
| Comp. Ex. 23 | Nicro Braz ® (Wall Colmonoy Corp.) nickel/chromium-based braze alloy with Si/B/Fe and <0.06 pbw carbon (about 1030° C. brazing temp.) | 40/50 mesh type IMG diamond abrasive |

Figure 2:
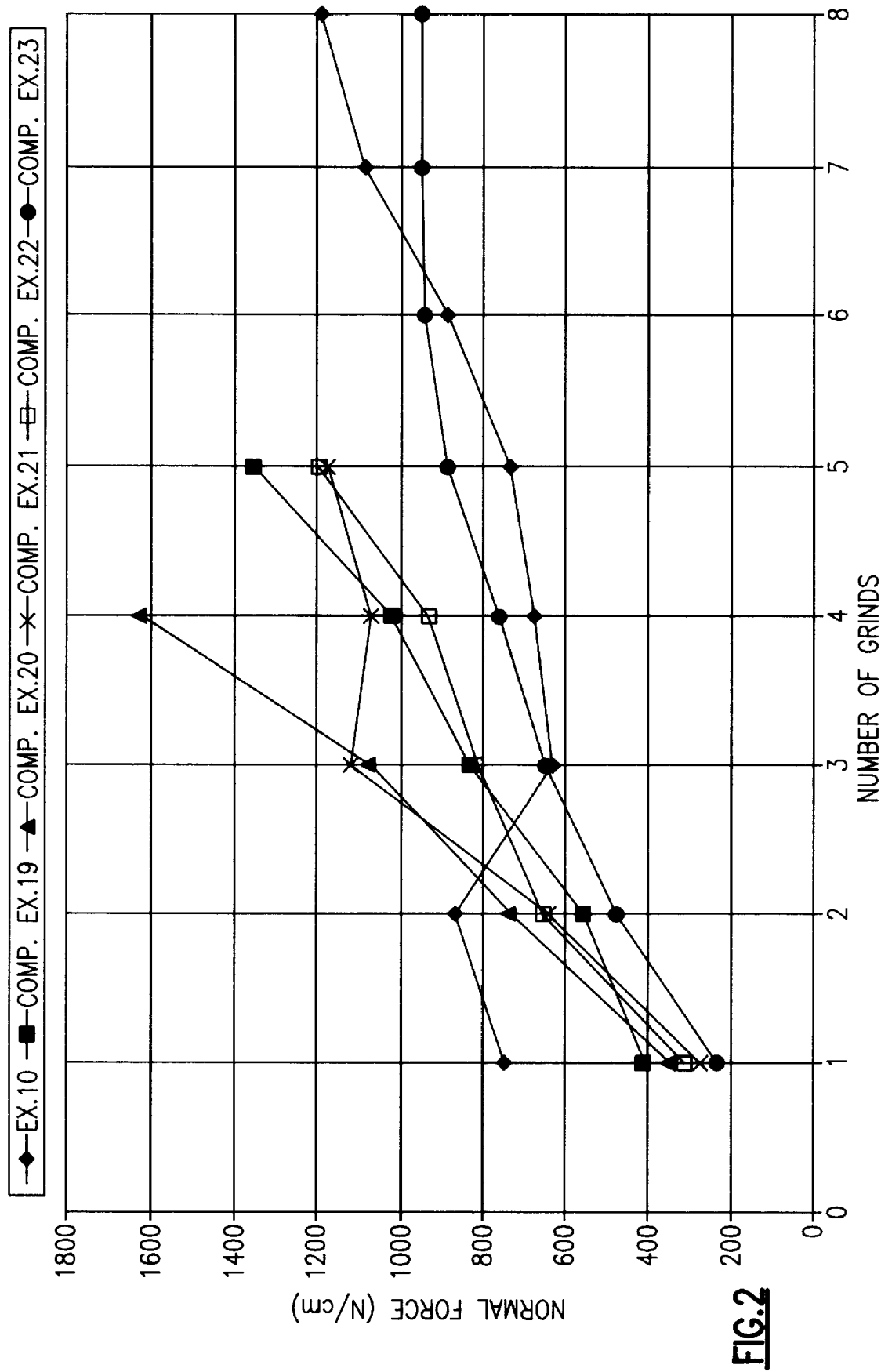
FIG. 2 is a plot of normal force, S, vs. number of grinds, N, for the metal single layer wheels of FIG. 1.

Results of the grinding tests are shown in FIGS. 1 and 2 which respectively illustrate the power consumption, P, in watts, and normal force, S, in units of N/cm of wheel crossfeed, as a function of number of grinds, n. Due to problems with equipment hydraulics which may have temporarily interrupted this test series, the data of Ex. 10 showed an anomaly at 1–2 grinds. Similar anomalies were seen in the Comp. Ex. 21 data at 3–4 grinds. The data show that the novel bond provided lower power consumption than all the comparative examples except the nickel-based braze alloy bond, Comp. Ex. 23. Similarly, the novel bond was able to withstand more than 7 grinds before the normal stress exceeded the failure criterion. Only the nickel-based bond was more durable. However, this bond material requires brazing at well over 1000° C. which makes it less suitable for metal single layer applications.

Example 11 and Comparative Examples 24–25

Three diamond abrasive wheels were made using the following bond materials, respectively: 77Cu-23Sn-12.5Ti-7.5Zr-10TiC-0.2C (Ex. 11); Cu/Sn bronze alloy (Comp. Ex. 24) and 77Cu-23Sn-10Ti (Comp. Ex. 25). Ex. 11 and Comp. Ex. 25 were MSL steel core wheels on which the bonds and abrasives were prepared substantially as in Example 1. Comp. Ex. 24 was a multilayer abrasive construction in which the diamond was uniformly dispersed in 16 abrasive segments laser welded to the periphery of the core. Each segment was 2.5 mm thick, 3.8 cm wide and contained 0.1 g diamond per segment. The cutting surface of each wheel was 22.86 cm diameter.

The wheels were used in an aggressive cutting test on 30.48 cm×30.48 cm×701 cm blocks of partially cured concrete. Disk rotation speed was 6300 rev. per minute, linear velocity was 4524 m per minute and depth of cut was 2.54 cm.

Ex. 11 wheel was able to cut 411.5 m of the work piece before failure. Failure was caused by wear of the steel core. The diamond grains remained firmly held by the bond at the conclusion of the test. Comp. Ex. 24 wheel also failed due to wear of the core, however, the failure occurred after cutting only 304 m. The novel bond thus demonstrated wear resistance superior to multilayer abrasive construction.

Figure 3:
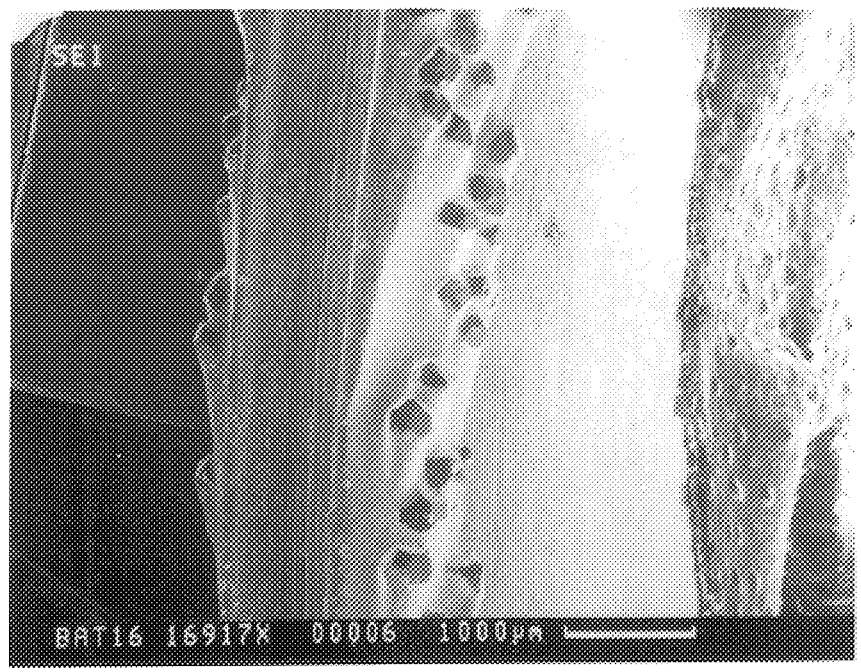
FIG. 3 is a photomicrograph of the surface magnified 17 times original size of a comparative metal single layer wheel after cutting partially cured concrete.
Figure 4:
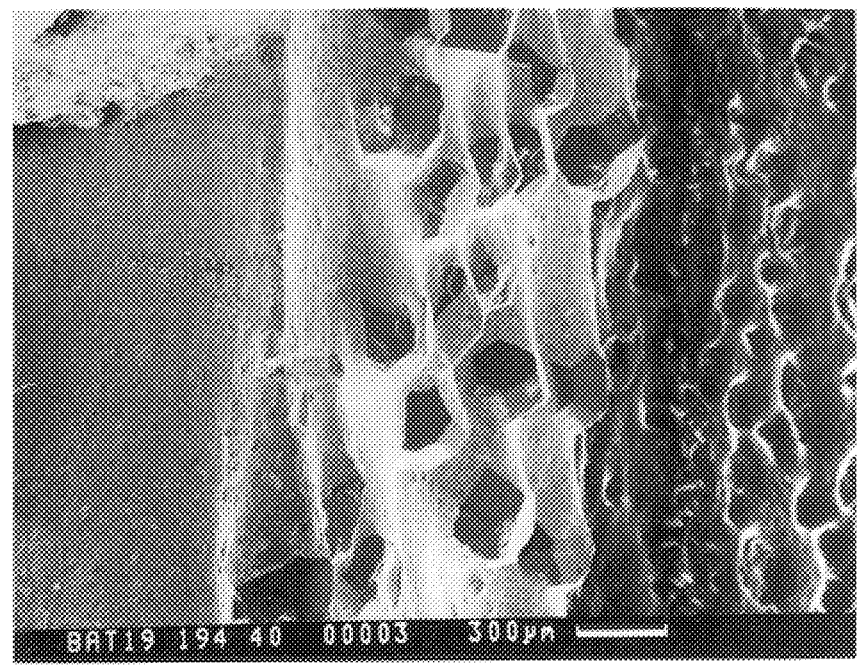
FIG. 4 is a photomicrograph of the surface magnified 40 times original size of a metal single layer wheel according to the present invention after cutting partially cured concrete.

Comp. Ex. 25 wheel failed after less than 300 m of cut. Failure was due to diamond grains releasing from the wheel from bond wear and to core wear. Reduced wear resistance of the bond causes the bond-to-grain area to diminish until insufficient bond remains to hold the grains. A photomicrograph of the cutting surface at 17×magnification was taken with a scanning electron microscope after failure and is shown in FIG. 3. FIG. 4 is a similar photomicrograph of the surface of Ex. 11 wheel at 40×magnification taken after failure. The irregular granular shapes in the central region of each figure are the diamond grains. Taking into account the scale difference between the photographs, the concentration of diamond grains remaining at failure on the wheel according to this invention (FIG. 4) is greater than that of the comparative wheel (FIG. 3). Considering that both wheels began the grinding test with the same diamond concentration, more diamond was retained by the novel bond which is attributed to its durability. Hence, one may conclude that the wear resistance of the novel bond material is superior to the comparative material.

I claim:

1. An abrasive tool having abrasive grains disposed in a single layer of substantially one grain thickness and affixed to a cutting surface of a metal core by a bond composition suitable for brazing at a temperature of about 800°–950° C., and comprising:
   (a) 100 parts by weight of a bronze alloy consisting essentially of about 10–30 wt % tin and a complementary amount of copper;
   (b) about 10–20 parts by weight titanium;
   (c) about 5–15 parts by weight zirconium;
   (d) about 0.1–0.5 parts by weight elemental carbon; and
   (e) about 5–20 parts by weight titanium carbide.

2. The abrasive tool of claim 1, wherein the abrasive grains are selected from the group consisting of diamond and cubic boron nitride.

3. The abrasive tool of claim 2 wherein the abrasive grains are diamond.

4. A process of making an abrasive tool comprising the steps of:
   (1) mixing
      (a) 100 parts by weight of a bronze alloy consisting essentially of about 10–30 wt % tin and a complementary amount of copper;
      (b) about 10–20 parts by weight titanium;
      (c) about 5–15 parts by weight zirconium;
      (d) about 0.1–0.5 parts by weight elemental carbon; and
      (e) about 5–20 parts by weight titanium carbide; effectively to form a uniformly concentrated bond material;
   (2) applying the bond material to a cutting surface of a metal core of an abrasive tool;
   (3) applying a single layer of uniformly dispersed abrasive grains onto the cutting surface; and
   (4) heating the bond material to a temperature and for a time effective to braze the abrasive grains to the metal core.

5. The process of claim 4 wherein step (1) further comprises the steps of:
   (i) mixing components (a)–(d) to form a uniform composition;

(ii) adding component (e) to the uniform composition; and (iii) mixing the composition of (ii) until component (e) is evenly dispersed throughout the uniform composition.

6. The process of claim 4 further comprising the step of mixing components (a)–(e) with an effective amount of a liquid binder to form a paste prior to applying the bond material to the cutting surface.

7. The process of claim 6 wherein titanium carbide is present in the bond material of step (1) as particles of size about 10 µm to about 44 µm.

8. The process of claim 7 wherein the temperature is about 800° to about 950° C.

9. The process of claim 6 wherein the abrasive grains are mixed into the bond material prior to applying the bond material to the cutting surface.

10. The process of claim 6 wherein the abrasive grains are selected from the group consisting of diamond and cubic boron nitride.

11. The process of claim 10 wherein the abrasive grains are diamond.

12. The process of claim 11, wherein the bond material comprises:
   (a) 100 parts by weight of a bronze alloy consisting essentially of about 23–25 wt % tin and a complementary amount of copper;
   (b) about 12.5 parts by weight titanium;
   (c) about 7.5 parts by weight zirconium;
   (d) about 0.2–0.4 parts by weight elemental carbon; and
   (e) about 10 parts by weight titanium carbide.

* * * * *